(12) United States Patent
Creighton et al.

(10) Patent No.: US 7,261,044 B2
(45) Date of Patent: Aug. 28, 2007

(54) BOXCAR WITH LOAD RESTRAINT SYSTEM

(75) Inventors: George S. Creighton, Double Oak, TX (US); D. Bruce Fetterman, Arlington, TX (US); Guy W. Steeves, Keller, TX (US); Robert J. Barry, Arlington, TX (US)

(73) Assignee: Trinity Industries, Inc., Dallas, TX (US)

( * ) Notice: Subject to any disclaimer, the term of this patent is extended or adjusted under 35 U.S.C. 154(b) by 0 days.

(21) Appl. No.: 11/197,639

(22) Filed: Aug. 4, 2005

(65) Prior Publication Data

US 2005/0268815 A1  Dec. 8, 2005

Related U.S. Application Data

(62) Division of application No. 10/782,138, filed on Feb. 19, 2004, now Pat. No. 7,004,080.

(60) Provisional application No. 60/509,935, filed on Oct. 9, 2003.

(51) Int. Cl.
  *B61D 17/00* (2006.01)
(52) U.S. Cl. .................. 105/404; 105/355; 105/409; 105/413; 105/423
(58) Field of Classification Search ............ 105/404, 105/409; 410/77, 79, 78, 80, 81, 82, 89, 410/90, 91, 101, 102, 104, 105, 115, 116, 410/130, 132, 139, 141, 142, 144, 150, 152

See application file for complete search history.

(56) References Cited

U.S. PATENT DOCUMENTS

| 215,625 | A |   | 5/1879  | Jauriet ........................ 62/423 |
|---|---|---|---|---|
| 1,085,058 | A |   | 1/1914  | Messick |
| 1,092,659 | A |   | 4/1914  | Mettler |
| 1,212,043 | A |   | 1/1917  | Freeman et al. |
| 1,284,111 | A |   | 11/1918 | Kestler |
| 1,330,361 | A | * | 2/1920  | Todd ......................... 105/357 |
| 1,494,579 | A |   | 5/1924  | Bohn ........................ 49/489.1 |
| 1,801,564 | A |   | 4/1931  | Muffly .................... 220/592.07 |
| 2,011,155 | A |   | 8/1935  | Neikirk ..................... 105/415 |
| 2,047,133 | A |   | 7/1936  | Christianson et al. ....... 105/409 |
| 2,169,692 | A |   | 8/1939  | Hansen |

(Continued)

FOREIGN PATENT DOCUMENTS

GB        J07564 A      3/1910

OTHER PUBLICATIONS

"IRECO Boxcar Lading Tie Anchor", at http://www/ireco.com/BoxcarLadingAnchors2761_3648.htm, 2 pages, Printed Dec. 15, 2003.

(Continued)

*Primary Examiner*—Mark T. Le
(74) *Attorney, Agent, or Firm*—Baker Botts L.L.P.

(57) ABSTRACT

A boxcar and load restraint system are provided with improved load carrying capabilities and performance characteristics of uninsulated boxcars and insulated boxcars. An insulated boxcar with the load restraint system may have increased load carrying capacity, increased service life, and reduced maintenance costs as compared to conventional insulated boxcars. All or portions of the load restraint system may be used in uninsulated boxcars.

16 Claims, 8 Drawing Sheets

U.S. PATENT DOCUMENTS

| | | | | |
|---|---|---|---|---|
| 2,269,631 A | 1/1942 | Marinello | | 105/377.09 |
| 2,605,064 A | 7/1952 | Davis | | 244/118 |
| 2,716,383 A | 8/1955 | Malcolm | | 410/112 |
| 2,756,693 A | 7/1956 | Frost | | 105/369 |
| 2,888,883 A | 6/1959 | Fritz et al. | | 105/250 |
| 3,137,247 A | 6/1964 | Hamilton et al. | | 105/251 |
| 3,179,068 A | 4/1965 | Jensen | | 105/369 |
| 3,288,531 A | 11/1966 | Bartsch | | |
| 3,343,725 A | 9/1967 | Cannon | | 122/129 |
| 3,408,956 A | 11/1968 | Rebenok et al. | | 105/240 |
| 3,434,433 A | 3/1969 | Floehr | | 105/249 |
| 3,455,253 A | 7/1969 | Floehr | | 105/251 |
| 3,468,062 A | 9/1969 | Hennessy | | 49/362 |
| 3,468,063 A | 9/1969 | Hennessy | | 49/362 |
| 3,501,030 A | 3/1970 | Flink | | 214/17 |
| 3,581,672 A | 6/1971 | Aquino | | 105/240 |
| 3,601,453 A | 8/1971 | Silverman | | 303/89 |
| 3,624,761 A | 11/1971 | Kohn | | 180/112 |
| 3,626,865 A | 12/1971 | Aquino et al. | | 105/240 |
| 3,636,658 A | 1/1972 | Bollinger, Sr. | | 49/362 |
| 3,656,437 A | 4/1972 | Kuzmicki | | 105/240 |
| 3,683,552 A | 8/1972 | Bollinger, Sr. | | 49/209 |
| 3,746,388 A | 7/1973 | Robinson | | 296/181.6 |
| 3,762,341 A | 10/1973 | Adler | | 410/103 |
| 3,789,772 A | 2/1974 | Bullard | | 105/240 |
| 3,796,007 A | 3/1974 | Bollinger, Sr. et al. | | 49/362 |
| 3,800,711 A | 4/1974 | Tuttle | | 105/251 |
| 3,802,356 A | 4/1974 | Hasselof et al. | | 105/376 |
| 3,837,296 A | 9/1974 | Loomis | | 105/376 |
| 3,843,081 A * | 10/1974 | Meier et al. | | 410/116 |
| 3,883,992 A | 5/1975 | Bollinger, Sr. | | 49/362 |
| 3,917,338 A | 11/1975 | Becker | | 410/116 |
| 3,923,327 A | 12/1975 | Ross, Jr. | | 292/39 |
| 3,949,681 A | 4/1976 | Miller | | 105/284 |
| 3,965,760 A | 6/1976 | Etheredge, Jr. | | 74/89.14 |
| 3,990,184 A | 11/1976 | Bollinger, Sr. | | 49/218 |
| 3,996,591 A | 12/1976 | Hayward | | 343/225 |
| 4,021,066 A | 5/1977 | McShane | | 292/144 |
| 4,114,318 A | 9/1978 | Brindle | | 49/215 |
| 4,136,621 A | 1/1979 | Schuller et al. | | 105/308 |
| 4,138,948 A | 2/1979 | Korolis | | 105/251 |
| 4,145,080 A | 3/1979 | Miller et al. | | 296/24.35 |
| 4,167,144 A | 9/1979 | Martin et al. | | 105/467 |
| 4,168,667 A * | 9/1979 | Loomis | | 410/118 |
| 4,227,732 A | 10/1980 | Kish | | 294/71 |
| 4,235,169 A | 11/1980 | Peterson | | 105/251 |
| 4,246,849 A | 1/1981 | Gramse | | 105/251 |
| 4,250,814 A | 2/1981 | Stark et al. | | 105/251 |
| 4,262,601 A | 4/1981 | Miller | | 105/241.2 |
| 4,342,267 A | 8/1982 | Blout | | 105/282 |
| 4,400,914 A | 8/1983 | Hennessy | | 49/362 |
| 4,417,526 A | 11/1983 | Marulic et al. | | 105/406.1 |
| 4,450,773 A | 5/1984 | Fritz et al. | | 105/282 |
| 4,491,354 A | 1/1985 | Williams | | 292/148 |
| 4,580,502 A | 4/1986 | Ritzl et al. | | 105/240 |
| 4,601,244 A | 7/1986 | Fischer | | 105/240 |
| 4,766,820 A | 8/1988 | Ritter et al. | | 105/240 |
| 4,829,908 A | 5/1989 | Hallam | | 105/240 |
| 4,930,427 A | 6/1990 | Ritter et al. | | 105/406.1 |
| 4,986,590 A | 1/1991 | Patti et al. | | 296/39.2 |
| 5,077,459 A | 12/1991 | Heumiller | | 219/117.1 |
| 5,115,748 A | 5/1992 | Westlake | | 105/286 |
| 5,144,895 A | 9/1992 | Murray | | 105/286 |
| 5,163,372 A | 11/1992 | Galvan et al. | | 105/240 |
| 5,177,988 A | 1/1993 | Bushnell | | 70/279 |
| 5,261,333 A | 11/1993 | Miller | | 105/287 |
| 5,263,422 A | 11/1993 | Barefoot | | 105/308.1 |
| 5,351,582 A | 10/1994 | Snyder et al. | | 81/57.17 |
| 5,562,989 A | 10/1996 | Statz | | 428/402 |
| 5,713,974 A | 2/1998 | Marin et al. | | 62/17.2 |
| 5,765,485 A | 6/1998 | Thoman et al. | | 105/404 |
| 5,802,984 A | 9/1998 | Thoman et al. | | 105/404 |
| 5,868,045 A | 2/1999 | Hauk | | 81/57.34 |
| 5,890,435 A | 4/1999 | Thoman et al. | | 105/404 |
| 6,019,049 A | 2/2000 | Gaydos et al. | | 105/289 |
| 6,092,472 A | 7/2000 | Thoman et al. | | 105/404 |
| 6,109,844 A | 8/2000 | Nadherny et al. | | 410/34 |
| 6,112,671 A | 9/2000 | Basile et al. | | 105/422 |
| 6,116,118 A | 9/2000 | Wesch, Jr. | | 81/57.34 |
| 6,138,529 A | 10/2000 | Pietras | | 81/57.33 |
| 6,138,580 A | 10/2000 | Thoman | | 105/396 |
| 6,186,563 B1 | 2/2001 | Kruzick et al. | | 292/201 |
| 6,270,600 B1 | 8/2001 | Wycech | | 156/79 |
| 6,279,487 B1 | 8/2001 | Gaydos et al. | | 105/289 |
| 6,315,509 B1 | 11/2001 | Nadherny et al. | | 410/116 |
| 6,367,391 B1 * | 4/2002 | Thoman et al. | | 105/404 |
| 6,374,546 B1 | 4/2002 | Fecko et al. | | 52/17 |
| 6,402,446 B1 | 6/2002 | Nadherny et al. | | 410/100 |
| 6,422,156 B1 * | 7/2002 | Winsor et al. | | 105/355 |
| 6,422,794 B1 | 7/2002 | Zhan et al. | | 410/100 |
| 6,450,105 B1 | 9/2002 | Glass | | 105/404 |
| 6,481,941 B2 | 11/2002 | Nadherny et al. | | 410/114 |
| 6,494,651 B1 | 12/2002 | Zhan et al. | | 410/116 |
| 6,575,102 B2 | 6/2003 | Norton et al. | | 105/423 |
| 6,585,466 B2 | 7/2003 | Zhan et al. | | 410/116 |
| 6,609,583 B2 | 8/2003 | Schillaci et al. | | 180/69.21 |
| 6,615,741 B2 | 9/2003 | Fecko et al. | | 105/404 |
| 6,626,623 B2 | 9/2003 | DeLay | | 410/116 |
| 6,655,886 B2 | 12/2003 | Grandy | | 410/112 |
| 6,709,209 B2 | 3/2004 | Zhan et al. | | 410/116 |
| 6,712,568 B2 | 3/2004 | Snyder et al. | | 410/104 |
| 6,722,287 B2 | 4/2004 | Norton et al. | | 105/404 |
| 6,748,841 B1 | 6/2004 | Fritz | | 87/57.41 |
| 6,761,840 B2 | 7/2004 | Fecko et al. | | 52/17 |
| 2002/0157565 A1 * | 10/2002 | Norton et al. | | 105/404 |
| 2006/0065152 A1 | 3/2006 | Heitmeyer et al. | | 105/404 |

OTHER PUBLICATIONS

"What is Vacuum Insulation? Vacuum Insulation [VI] Explained . . . ", at http://www.estglobal.com/tech-vip.html, 2 pages, Printed Oct. 5, 2004.

Equipment Diagram for Unrestricted Interchange Service Standard, Association of American Railroads, Plate F, Apr. 1, 1978.

PCT International Search, PCT US2004/027519, 8 pages, Aug. 26, 2003.

PCT International Search, PCT US2004/027508, 12 pages, Aug. 26, 2003.

Invitation to Pay Additional Fees; PCT/US2004/027508; 6 pages, Jun. 12, 2004.

Notification of Transmittal of The International Search Report and The Written Opinion of the International Searching Authority for PCT/US2004/027519; 14 pages, Nov. 30, 2004.

Notification of Transmittal of The International Search Report and The Written Opinion of the International Searching Authority for PCT/US2004/027508; 19 pages, Feb. 16, 2005.

* cited by examiner

BOXCAR WITH LOAD RESTRAINT SYSTEM

RELATED APPLICATIONS

This application is a U.S. divisional application claiming the benefit of U.S. patent application entitled "Boxcar With Load Restraint System," Ser. No. 10/782,138 filed Feb. 19, 2004, now U.S. Pat. No. 7,004,080, which claims the benefit of U.S. provisional patent application entitled, "Universal Boxcar," Ser. No. 60/509,935 filed Oct. 9, 2003.

This application is related to U.S. patent application entitled, "Universal Boxcar," Ser. No. 10/960,221, filed Oct. 7, 2004, now U.S. Pat. No. 7,210,413, which claims the benefit of U.S. provisional patent application entitled, "Universal Boxcar," Ser. No. 60/509,935 filed Oct. 9, 2003; and copending patent application entitled "Safety Latch Lock Indicator for Railcar Door Operation Mechanism", Ser. No. 11/182,975, filed Jul. 15, 2005, which claims the benefit of U.S. provisional patent application entitled, "Safety Latch Lock Indicator for Railcar Door Operation Mechanism", Ser. No. 60/600,290 filed Aug. 10, 2004.

TECHNICAL FIELD

The present invention is related to railway cars with load restraint systems including both insulated boxcars and uninsulated boxcars.

BACKGROUND OF THE INVENTION

Over the years general purpose boxcars have progressed from relatively simple wooden structures mounted on flat cars to more elaborate arrangements including insulated walls and refrigeration equipment. Various types of insulated and uninsulated boxcars are presently manufactured and used. A typical boxcar includes an enclosed structure mounted on a railway car underframe. The enclosed structure generally includes a floor assembly, a pair of sidewalls, a pair of endwalls and a roof assembly. Insulated boxcars often include sidewalls, endwalls and a roof formed in part by an outer surface, one or more layers of insulation and an interior surface.

The outer surface of many boxcars may be formed from various types of metal such as steel or aluminum. The interior surfaces may be formed from wood and/or metal as desired for specific applications. For some applications the interior surfaces may be formed from fiber reinforced plastic (FRP). Various types of sliding doors including plug type doors are generally provided on each side of a boxcar for loading and unloading freight.

The underframe for many boxcars includes a center sill with a pair of end sill assemblies and a pair of side sill assemblies arranged in a generally rectangular configuration corresponding approximately with dimensions of the floor assembly of the boxcar. Cross bearers and/or cross ties may be provided to establish desired rigidity and strength for transmission of vertical loads from an associated floor assembly to associated side sills which in turn transmit the vertical loads from the floor assembly to associated body bolsters and distribute horizontal end loads on the center sill to other portions of the underframe. Cross bearers and cross ties generally cooperate with each other to support a plurality of longitudinal stringers. The longitudinal stringers are often provided on each side of the center sill to support the floor assembly of a boxcar.

Applicable standards of the Association of American Railroads (AAR) established maximum total weight on rail for any railway car including boxcars, freight cars, hopper cars, gondola cars, and temperature controlled railway cars within prescribed limits of length, width, height, etc. All railway cars operating on commercial rail lines in the U.S. must have exterior dimensions which satisfy associated AAR clearance plates. Therefore, the maximum load which may be carried by any railway car is typically limited by the applicable AAR clearance plate, AAR maximum total weight on rail and empty weight of the railway car.

Reducing the empty weight of a railway car or increasing interior dimensions may increase both volumetric capacity and maximum load capacity of a railway car while still meeting applicable AAR standards. Traditionally, insulated boxcars have less inside height and width than desired for cost effective shipment of some types of lading. The maximum exterior width of any boxcar is limited by applicable AAR clearance plates. The maximum interior width is limited by the amount (thickness) of insulation required to satisfy applicable AAR heat transfer limitations or UA factor. Door operating tubes, door bottom tracks and door handles are often built to the extreme width of applicable AAR plate diagrams. Locating door assembly components at the maximum width provides as much interior width as possible for carrying lading within an insulated boxcar or uninsulated boxcar. Door assembly components for many conventional insulated boxcars may extend approximately four inches (4") from each side of the boxcar. Therefore, interior dimensions of such boxcars are also limited by the four inch extension of the associated door assemblies.

Conventional insulated boxcars may have an inside width of nine feet or less while many uninsulated boxcars often have an inside width of approximately nine feet, six inches. Prior insulated boxcars have been relatively ineffective at increasing interior volumetric capacity while maintaining desired UA rating or minimum insulation efficiency required by AAR. At least one insulated boxcar has been built with a nominal length of fifty two feet six inches (52' 6") and an interior width of approximately nine feet six inches (9'6"). This particular insulated boxcar had a UA factor of approximately 285 BTU/F/hour which is greater than applicable AAR requirements. AAR specifications place various requirements on insulated boxcars such as sidewalls, endwalls, floor and roof having a maximum UA factor of 250 BTU/F/hour for a fifty foot boxcar and a maximum UA factor of 300 BTU/F/hour for a sixty foot boxcar.

SUMMARY OF THE INVENTION

In accordance with teachings of the present invention, disadvantages and problems associated with both insulated and uninsulated boxcars have been substantially reduced or eliminated. One embodiment of the present invention may include a dual use or universal boxcar satisfactory for carrying temperature controlled lading and nontemperature controlled lading. The present invention provides a boxcar and load restraint system capable of transporting a wide variety of freight, such as frozen food products and fresh food products which require temperature control and nonperishable products and paper products which do not require temperature control.

An insulated boxcar incorporating teaching of the present invention may provide load carrying capacity of a conventional uninsulated boxcar and have substantially the same UA factor or heat transfer rating as a conventional insulated boxcar. An insulated boxcar and load restraint system incorporating teachings of the present invention may provide the same load pattern and load storage capability as a corresponding uninsulated boxcar.

One aspect of the present invention includes providing a boxcar with interior surfaces and a load restraint system satisfactory for carrying lading such as coiled steel, lumber, pasteurized and unpasteurized beer, wine, automobile parts, household goods, appliances, electronic equipment, newsprint, paper rolls, paper products, liquid filled containers, canned food products and/or packaged food products (both perishable and non-perishable) and other packaged goods. The present invention allows designing sidewall assemblies with load restraint systems and reasonably priced insulating materials to minimize heat transfer rates between the interior and the exterior of the sidewall assemblies and to maximize load carrying capacity.

Some types of lading such as food products have specific requirements for cleaning the interior of a boxcar prior to loading. Water from cleaning and/or condensation may collect in floor located tie down assemblies and cargo anchors resulting in corrosion and increased maintenance costs. Cargo anchors or tie down assemblies located in the floor of a conventional boxcar often rust and prematurely fail as a result of corrosion associated with water retained within such cargo anchors or tie down assemblies. The water may also damage paper products, food and other types of lading. A load restraint system incorporating teachings of the present invention may eliminate or substantially reduce problems associated with cleaning the interior of a boxcar having conventional tie down assemblies and cargo anchors located in an associated floor.

The present invention allows tie down assemblies and anchors associated with many conventional boxcars to be removed from the floor to improve heat transfer characteristics. Tie down assemblies and anchors may be attached to or formed as components of structural members associated with each sidewall assembly in accordance with teachings of the present invention. Placing anchors and tie down assemblies in adjacent sidewall assemblies allows improved cleaning of an associated floor and provides a generally smooth floor surface satisfactory for carrying lading such as paper rolls or any other lading which may be damaged by conventional tie down assemblies and cargo anchors located in a floor.

One aspect of the present invention includes placing one or more tie down assemblies or anchor assemblies in the sidewalls of an insulated boxcar and preferably having no tie down assemblies or anchor assemblies disposed within the floor of an insulated boxcar. Eliminating tie down assemblies or anchor assemblies from the floor generally improves heat transfer characteristics of the insulated boxcar. Tie down assemblies and anchors located in the floor of a conventional insulated boxcar often act as thermal shorts which increase heat transfer rates through the floor.

Tie down assemblies and cargo anchors attached to a sidewall assembly in accordance with teachings of the present invention may have substantially increased load carrying capacity as compared with prior sidewall tie down assemblies or cargo anchors. For example floor anchors associated with conventional boxcars may be used to restrain loads weighing thirty thousand pounds (30,000 lbs.). Conventional sidewall anchors are often not able to support this much load. Tie down assemblies and cargo anchors formed in accordance with teachings of the present invention may be used to satisfactorily restrain thirty thousand pound steel coils while eliminating or reducing potential risk of corrosion and maintaining desired thermal efficiency. For some applications, a limited number of conventional cargo anchors or load restraints may be disposed within an associated floor assembly proximate openings in the associated sidewall assembly.

BRIEF DESCRIPTION OF THE DRAWINGS

For a more complete understanding of the present invention, and advantages thereof, reference is now made to the following written description taken in conjunction with the accompanying drawings, in which.

DETAILED DESCRIPTION OF THE INVENTION

Preferred embodiments of the invention and its advantages are best understood by reference to FIGS. 1-13 of the drawings, like numerals are used for like and corresponding parts in the various drawings.

The term "boxcar" often refers to a railway car having a generally elongated box type structure defined in part by a roof assembly, a floor assembly, a pair of sidewall assemblies, and a pair of endwall assemblies which cooperate with each other to define a generally hollow interior satisfactory for carrying various types of lading. The terms "boxcar" and "box car" may be used in this application to refer to both insulated and uninsulated boxcars.

The terms "side sheet" and "side sheets" may be used in this application to refer to any type of material satisfactory to form exterior and interior surfaces of a sidewall assembly. For some applications, side sheets may be formed from wood, metal, composite materials or combinations thereof. Steel alloys and aluminum alloys are examples of metals which may be used to form side sheets for a boxcar incorporating teachings of the present invention. Composite materials such as fiber reinforced plastics in the form of rolled sheets or extruded panels may be used to form side sheets for a boxcar incorporating teachings of the present invention. Other examples of composite materials which may be used to form side sheets include, but are not limited to, plastic polymers, polyvinyl chloride (PVC) and urethane. The side sheets may be formed from composite materials using various techniques such as extrusion and pultrusion.

The terms "end sheet" and "end sheets" may be used in this application to refer to any type of material satisfactory to form exterior and interior surfaces of an endwall assembly. For some applications, end sheets may be formed from wood, metal, composite materials or combinations thereof. Steel alloys and aluminum alloys are examples of metals which may be used to form end sheets for a boxcar incorporating teachings of the present invention. Composite materials such as fiber reinforced plastics in the form of rolled sheets or extruded panels may be used to form end sheets for a boxcar incorporating teachings of the present invention. Other examples of composite materials which may be used to form end sheets include, but are not limited to, plastic polymers, polyvinyl chloride (PVC) and urethane. The end sheets may be formed from composite materials using various techniques such as extrusion and pultrusion.

Various aspects of the present invention will be described with respect to insulated boxcars 20 and 320. However, the present invention is not limited to insulated boxcars. For example, some features of the present invention may be satisfactorily used to form uninsulated boxcars, temperature controlled railway cars, refrigerated boxcars and any other type of railway car having at least one sidewall assembly and a floor assembly mounted on a railway car underframe.

A boxcar may be formed in accordance with teachings of the present invention to accommodate various geometric configurations and load carrying requirements to satisfy specific customer needs concerning size and temperature specifications for different types of lading. Examples of such lading include, but are not limited to, coiled steel, lumber, pasteurized and unpasteurized beer, wine, automobile parts, household goods, appliances, electronic equipment, liquid filled containers, newsprint, paper rolls, paper products, nonperishable food products and any other product suitable for transport in a boxcar and does not require temperature control. Further examples of such lading include, but are not limited to, perishable food products and any other product suitable for transport in a boxcar that requires temperature control.

The present invention allows insulated boxcars 20 and 320 to have flexible loading capability to improve potential for carrying back-haul loads. Insulated boxcars 20 and 320 may be used to carry lading associated with both insulated and uninsulated boxcars and may sometimes be referred to as "universal" boxcars. In the past, materials, configuration, size and components associated with conventional insulated boxcars often limited their ability to be effectively used to carry lading associated with uninsulated boxcars. To accommodate cargo that would typically be shipped using an uninsulated boxcar, insulated boxcars 20 and 320 may include metal interior surfaces, cargo anchors and large interior volumes equal to or greater than many uninsulated boxcars while meeting or exceeding requirements published by the AAR for insulated boxcars.

Insulated boxcar 20 may include box structure 30 mounted on railway car underframe 200. For some applications, insulated boxcar 20 may be modified to include a temperature control system (not expressly shown) and an airflow management system (not expressly shown). For embodiments of the invention as shown in FIGS. 1-7, insulated boxcar 20 may have a nominal length of sixty feet, exterior dimensions which satisfy the Association of American Railroads (AAR) Plate F clearance requirements and associated AAR design and heat transfer requirements. Insulated boxcar 20 is only one example of a boxcar which may be formed in accordance with teachings of the present invention.

Box structure 30 may be formed from various components including roof assembly 40, sidewall assemblies 150 and 152, floor assembly 80 and endwall assemblies 120 and 122. Forming various components of box structure 30 and railway car underframe 200 in accordance with teachings of the present invention may result in reducing the empty weight of insulated boxcar 20 while at the same time increasing interior volume and/or load carrying capacity as compared to many conventional insulated boxcars with the same AAR Plate F clearance and UA factor. For some applications insulated boxcar 20 may have the same or possibly larger interior volume or cubic capacity as compared to uninsulated boxcars satisfying AAR Plate F clearance requirements.

Figure 2:
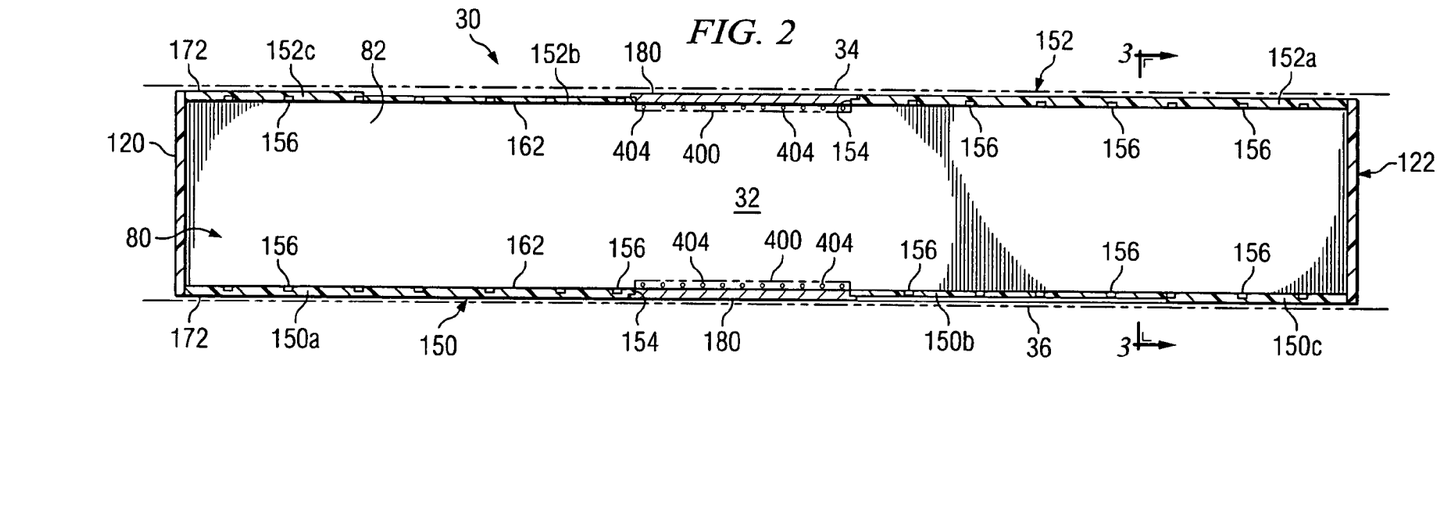
FIG. 2 is a schematic drawing in section with portions broken away showing a plan view of a floor assembly, sidewall assemblies and endwall assemblies incorporating teachings of the present invention.
Figure 4:
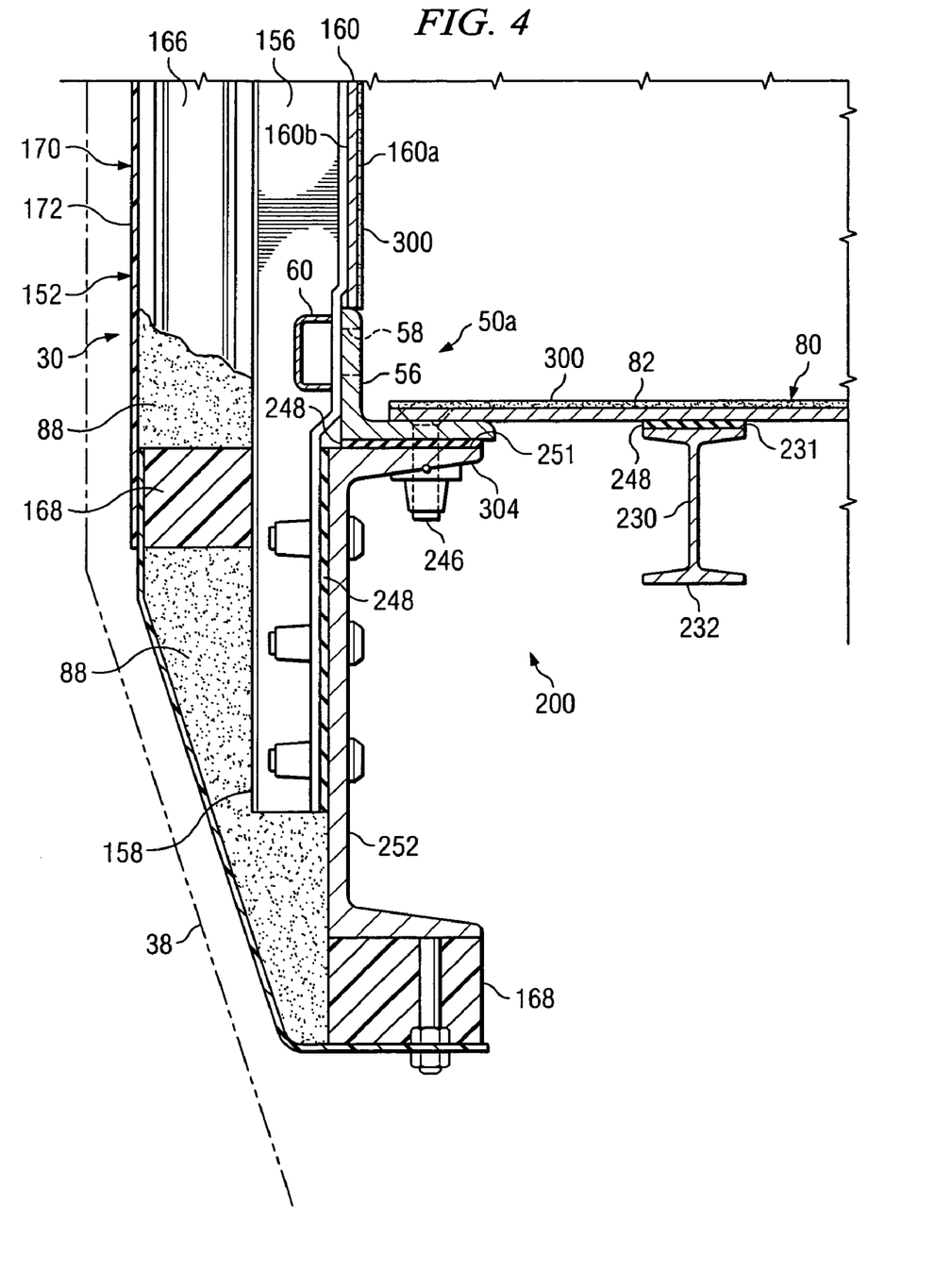
FIG. 4 is a schematic drawing in section with portions broken away showing one example of a floor assembly, a sidewall assembly and a side sill having components of a load restraint system incorporating teachings of the present invention.

The configuration of sidewall assemblies 150 and 152 may correspond with the dimensions of AAR Clearance plate F represented by dotted lines 34, 36 and 38. Dotted lines 34 and 36 as shown in FIG. 2 represent maximum allowed AAR clearance for boxcar 20. Dotted line 38 as shown in FIG. 4 also represents applicable AAR clearance plate dimension.

For embodiments of the present invention as shown in FIGS. 1-7 and 9, railway car underframe 200 preferably includes a pair of body bolsters (not expressly shown) with each body bolster disposed over respective railway trucks 202 and 204. The body bolsters may extend laterally from center sill 214. For some applications, each body bolster may include cover plates (not expressly shown) which extend over the wheels of railway car trucks 202 and 204. Railway car underframe 200 may also include center sill 214, longitudinal stringers 230 and side sill assemblies 250 and 252 arranged in a generally rectangular configuration. Cross bearers and/or cross ties (not expressly shown) may be attached to and extend laterally from center sill 214 and respective side sill assemblies 250 and 252.

One or more ladders 206 may be attached to the exterior of box structures 30 and 330 adjacent to railway car underframe 200. Each ladder 206 may be disposed within a portion of an associated sidewall assembly to minimize interference with applicable AAR clearance plate. Hand brake 208 and other accessory components associated with boxcars may also be mounted on railway car underframe 200. Standard railcar couplings 210 may be provided at each end of railway car underframe 200. Each coupling 210 may include respective end of car cushioning unit 212 disposed at each end of center sill 214. See FIGS. 1 and 9.

A plurality of longitudinal stringers 230 preferably extend approximately the full length of railway car underframe 200 generally parallel with center sill 214. Longitudinal stringers 230 may be disposed on associated cross bearers (not expressly shown). Portions of floor assembly 80 may be disposed on longitudinal stringers 230, center sill 214, and respective portions of side sill assemblies 250 and 252. Each longitudinal stringer 230 preferably includes first surface 231 and second surface 232. See FIGS. 3, 4 and 5. The number of cross bearers and/or cross ties and longitudinal stringers 230 may be varied depending upon desired load carrying characteristics for the resulting insulated boxcar 20.

Figure 3:
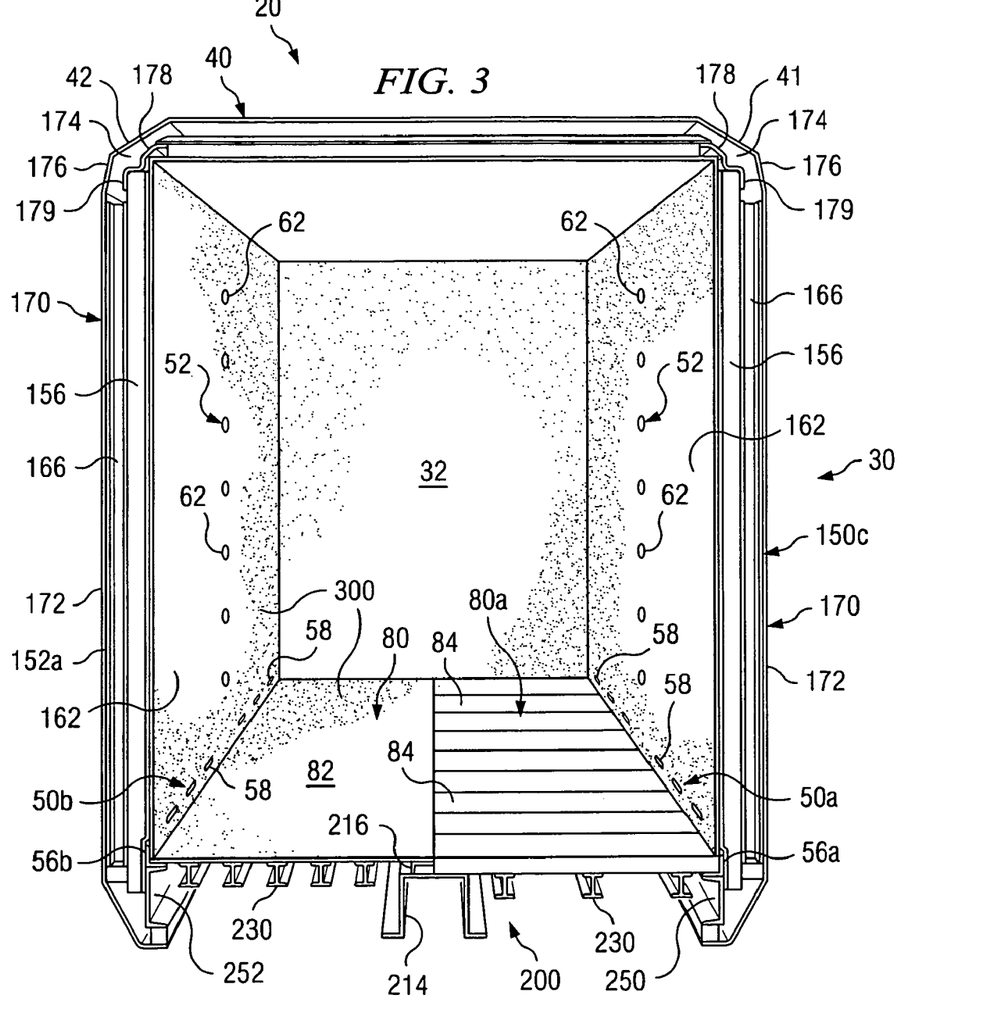
FIG. 3 is a schematic drawing in section with portions broken away showing examples of interior surfaces of an insulated boxcar incorporating teachings of the present invention.

Various types of floor assemblies may satisfactorily be used to form a boxcar in accordance with teachings of the present invention. FIG. 3 shows two different types of floor assemblies 80 and 80a which may be used to form boxcar 20 and/or boxcar 320. Floor assembly 80 may be formed by mounting metal plates on longitudinal stringers 230, associated side sill assemblies 250 and 252 and center sill 214. Alternatively, floor assembly 80a formed from nailable metal planks 84 may be used. One example of a nailable metal floor satisfactory for use with the present invention is shown in U.S. Pat. No. 6,112,671 entitled "Railway Freight Car Metal Floor". Nailable metal floors are available from various vendors.

For some applications, a generally C-shaped channel 216 may be disposed on center sill 214 to accommodate the installation of floor assembly 80. When nailable metal planks 84 are used to form floor assembly 80a, channel 216 will generally not be required since nailable metal planks 84 have increased thickness as compared with the metal plates used to form floor assembly 80. Also, fewer longitudinal stringers 230 may be required when boxcar 20 includes floor assembly 80a.

Figure 5:
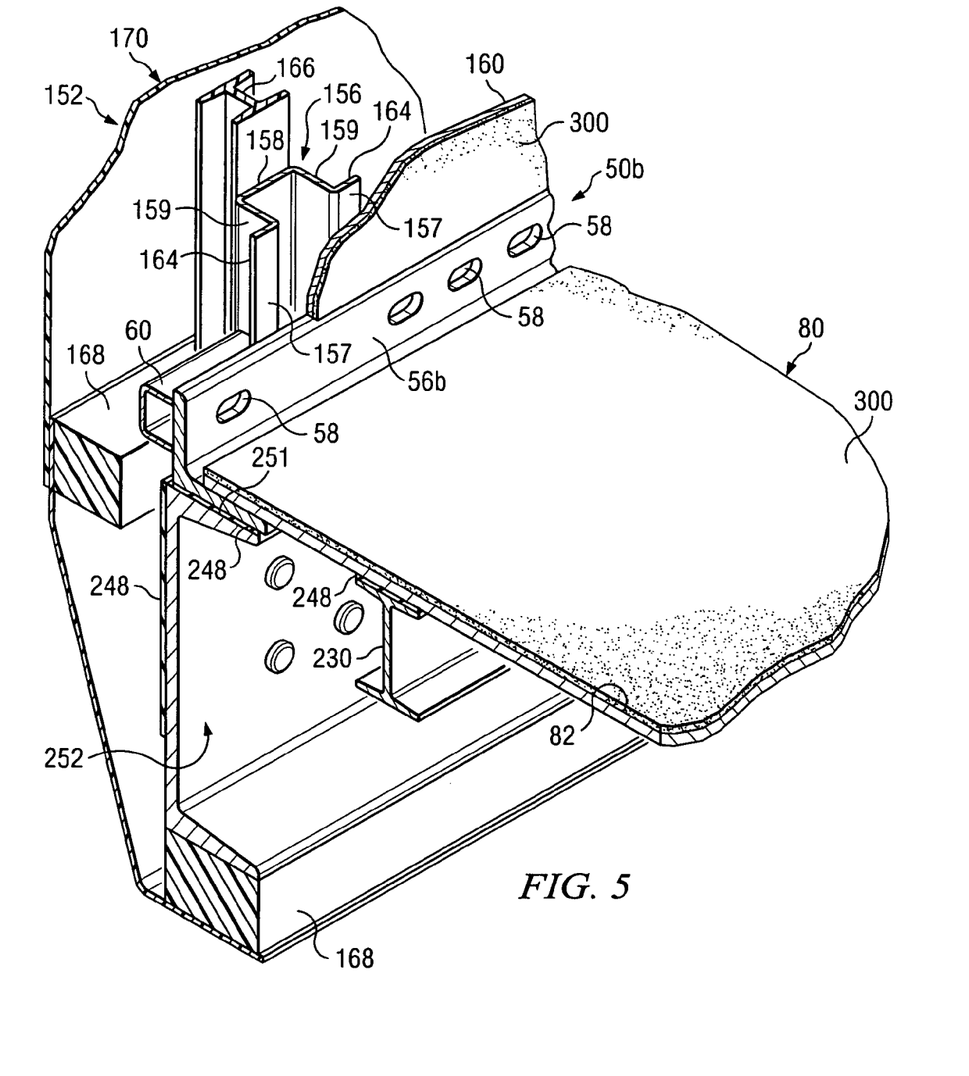
FIG. 5 is a schematic drawing showing an isometric view with portions broken of various components of the load restraint system of FIG. 4.

Sidewall assemblies 150 and 152 may be fabricated with respective side sill assemblies 250 and 252 formed as integral components thereof. Endwall assemblies 120 and 122 may also be formed with all or at least portions of respective end sill assemblies (not expressly shown) formed as integral components thereof. Side sill assemblies 250 and 252 may have substantially the same overall configuration and dimensions. As shown in FIGS. 3, 4 and 5 side sill assemblies 250 and 252 may have a generally C-shaped cross section. However, other side sill designs may satisfactorily be used with a boxcar incorporating teachings of the present invention.

Portions of the roof assembly 40, floor assembly 80, sidewall assemblies 150 and 152 and/or endwall assemblies 120 and 122 may be formed from conventional materials such as steel alloys and/or other metal alloys used to manufacture railway cars. Portions of roof assembly 40, floor assembly 80, sidewall assemblies 150 and 152 and/or endwall assemblies 120 and 122 may also be formed with insulating materials such as closed cell urethane foam and polyvinyl chloride blocks. For many applications, froth foam or other types of foam insulation (not expressly shown) may be applied to underframe 200 adjacent to floor assembly 80 to improve thermal heat transfer characteristics of the associated railway boxcar. Examples of various materials which may be used to form a boxcar and load restraint system incorporating teachings of the present invention are discussed throughout this application.

Various components associated with box structure 30 may be fabricated individually and then attached to or mounted on railway car underframe 200 to form insulated boxcar 20. Individually manufacturing or fabricating various components of box structure 30 may allow optimum use of conventional railcar manufacturing techniques. Alternatively, one or more of the components associated with box structure 30 may be fabricated and assembled on railway car underframe 200 to allow optimum use of conventional railcar manufacturing techniques.

Figure 1:
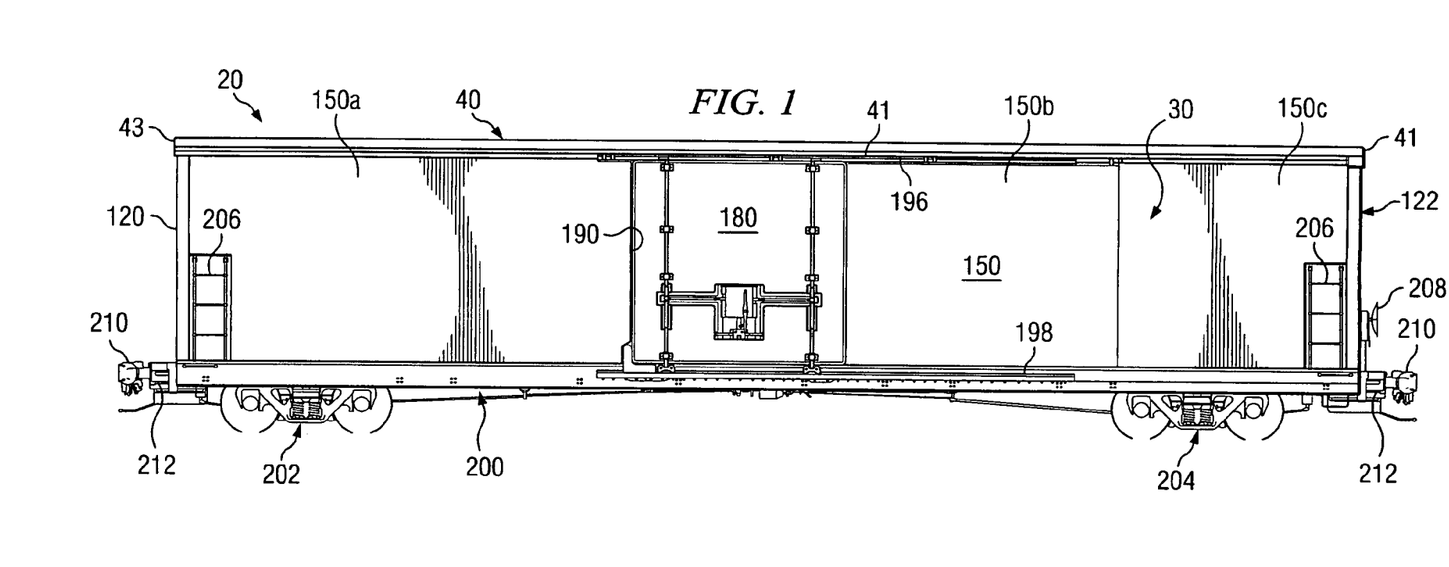
FIG. 1 is a schematic drawing in elevation showing a side view of an insulated boxcar incorporating teachings of the present invention.

As shown in FIGS. 1 and 2 the thickness of each sidewall assembly 150 and 152 may vary longitudinally between endwall assembly 120 and endwall assembly 122. Conventional sidewall assemblies often have a generally symmetrical configuration with respect to each other and an associated railway car underframe. Sidewall assembly 150 may include first portion 150a, second portion 150b and third portion 150c. Opening 154 may be formed between portion 150a and 150b. Opening 154 is preferably sized to receive door assembly 180 which controls access to interior 32 of box structure 30.

First portion 150a and third portion 150c may have increased thickness to accommodate additional insulation materials. Second portion 150b may have reduced thickness to accommodate movement of associated door assembly 180 between its first, closed position as shown in FIG. 1, and a second, open position (not expressly shown). Sidewall assembly 152 may also include first portion 152a with an increased thickness, second portion 152b with a reduced thickness, third portion 152c with an increased thickness and respective door opening 154. As shown in FIG. 2 the arrangement of portions 152a, 152b and 152c may be substantially reversed as compared with sidewall assembly 150.

Interior side sheets 160 cooperate with each other to form interior surface 162 of each sidewall assembly 150 and 152. Exterior side sheets 170 cooperate with each other to form exterior surface 172 of each sidewall assembly 150 and 152. For some applications sidewall assemblies 150 and 152 may be formed with interior metal surfaces 162 and exterior surfaces 172 of fiber reinforced plastic or other composite materials. For other applications side sheets 160 and 170 may be formed from metal alloys. For still other applications side sheets 170 may be formed from metal alloys and side sheets 160 formed from wood and/or composite materials. Conventional insulating materials such as closed cell urethane foam 88 may be disposed between and bonded with adjacent portions of side sheets 160 and 170.

For embodiments shown in FIGS. 1-7, sidewall assemblies 150 and 152 may include a plurality of support posts 156, side sheets 160 formed from metal alloys and side sheets 170 formed from fiber reinforced plastic. For some application rolls of relatively thin Fiberglass® material may be used to form side sheets 170 on sidewall assemblies 150 and 152. Respective side sheets 170 may partially overlap each other to cover substantially the full length and height of each sidewall assembly 150 and 152.

Side sheets 160 may be attached with first or interior surfaces 157 of each support post 156. See FIG. 5. Respective beams 166 may be bonded with or attached to second surface 158 of each support post 156 opposite from side sheets 160. For some applications beams 166 may be formed from polyvinyl chloride (PVC) type materials and may have the general cross section of an I beam. Side sheets 170 may be bonded with each beam 166 opposite from respective support post 156.

For some applications blocks 168 may be disposed within each sidewall assembly to aid in maintaining liquid foam at desired locations during solidification. See FIGS. 4 and 5.

Various types of insulation including, but not limited to, closed cell urethane foam 88 may be injected or poured into void spaces defined in part by side sheets 160, support posts 156, beams 166 and side sheets 170. Pour foam may be injected faster into void spaces and will generally cure faster as compared to other types of insulating foam. Since pour foam often experiences higher pressures while curing, sidewall assemblies 150 and 152 and endwall assemblies 120 and 122 will generally be placed in appropriate fixtures (not expressly shown) during the curing process. After sidewall assemblies 150 and 152, endwall assemblies 120 and 122 and roof assembly 40 have been mounted on and attached to railway car underframe 200, froth foam may be added to or sprayed into any remaining void spaces. Pour type urethane foam may be obtained from various suppliers including, but not limited to, Carpenter Company. Froth foam may also be obtained from various suppliers including, but not limited to, Foam Supplies, Inc.

For some applications froth foam may be injected into void spaces 174 formed between roof assembly 40 and respective sidewall assemblies 152 and 150. See FIG. 3. Pultruded or extruded panels of composite material 176 may be used to cover void spaces 174. A layer or strip of composite material associated with the exterior of roof assembly 40 may overlap or cover a portion of extruded panels 176. In a similar manner portions of extruded panels 176 preferably overlap adjacent side sheets 170.

Each side sheet 160 may include first surface 160a and second surface 160b. First surface 160a of side sheets 160 cooperate with each other to form a portion of the interior surfaces 162 of box structure 30. For one application side sheets 160 may be formed from twelve (12) gauge steel. For other applications side sheets 160 may be formed from aluminum alloys.

Hucks and other types of mechanical fasteners such as shown in FIGS. 4 and 5 may be satisfactorily used to attach support posts 156 with adjacent portions of side sill assemblies 250 and 252. Layers of insulating material or isolators 248 may be disposed between adjacent portions of support posts 156 and respective side sill assembly 250 and 252. Isolation 248 may also be disposed between longitudinal stringer 230 and floor assembly 80. Isolators 248 and 302 may be formed from various types of materials such as fiberglass, PVC type material or any other satisfactory insulating material which has both the required strength and desired heat transfer characteristics to provide the desired UA factor for box structure 30.

For some applications, beams 166 formed from an insulating material such as polyvinyl chloride (PVC) may be attached to second surface 158 of each support post 156. Beams 166 may also be formed from urethane foam. Side sheets 170 may be bonded with beams 166 opposite from support posts 156. Various types of blocks and/or strips of insulating materials may also be used to couple side sheets 170 with respective support posts 156. Placing beams 166 between support post 156 and adjacent portions of side sheets 170 provides sufficient structural strength and minimizes heat transfer between the interior and exterior of box structure 30 via support posts 156.

For one embodiment sidewall assembly 150 may be mounted on one longitudinal edge of railway car underframe 200 with side sill assembly or bottom chord 250 disposed adjacent to ends of associated cross bearers or cross beams opposite from center sill 214. In a similar manner sidewall assembly 152 may be mounted on an opposite longitudinal edge of railway car underframe 200 with side sill assembly or bottom chord 252 disposed adjacent to ends of associated cross bearers or cross beams opposite from center sill 214. Various types of mechanical fasteners and/or welds may be formed between side sill assemblies 250 and 252 and respective cross beams or cross bearers.

Sidewall assemblies 150 and 152 preferably include respective top chords 178. Top chords 178 may extend longitudinally along the respective upper edge of sidewall assemblies 150 and 152. Each top chord 178 may have a cross section defined by a generally "W-shaped" portion with leg 179 extending therefrom. The upper portion of adjacent side sheets 160 may be attached with the W portion of each of the associated top chord 178. See FIG. 3. Various techniques such as welding and/or mechanical fasteners may be used to attached side sheets 160 with adjacent portions of top chords 178.

Roof assembly 40 may be formed with a generally elongated, rectangular configuration. The length and width of roof assembly 40 corresponds generally with the desired length and width of box structure 30. Roof assembly 40 may include first longitudinal edge 41 and second longitudinal edge 42 spaced from each other and extending generally parallel with each other from first lateral edge 43 to second lateral edge 44. First longitudinal edge 41 and second longitudinal edge 42 are preferably mounted on and attached with adjacent portions of respective sidewall assemblies 150 and 152. See FIG. 3. Various types of composite materials and/or insulating materials may be satisfactorily used to form roof assembly 40.

Endwall assemblies 120 and 122 may be formed using similar materials and techniques as previously described with respect to sidewall assemblies 150 and 152. Endwall assemblies 120 and 122 may be formed with end beams 126 having an I-beam configuration. End beams 126 disposed within endwall assemblies 120 and 122 generally extend horizontally with respect to each other and railway car underframe 200. See FIG. 7.

End beams 126 may be attached with end sheets 124. Respective isolators 128 formed from insulating materials such as PVC or urethane foam may be attached to each end beam 126 opposite from end sheets 124. End sheets 130 may be attached to isolators 128 to form the exterior of end wall assemblies 120 and 122. Foam insulation 88 may be disposed between and bonded with adjacent portions of end beams 126, end sheets 124 and adjacent portions of end sheets 130. For one embodiment endwall assembly 120 may be mounted on the first end or A end may be of railway car underframe 200. In a similar manner, endwall assembly 122 may be mounted on the second end or B end of railway car underframe 200.

Each endwall assembly 120 and 122 preferably includes a respective top chord or top plate 132 attached with upper portions of adjacent end sheets 124. Roof assembly 40 may be attached to and/or bonded with respective top chords 178 of sidewall assemblies 150, 152 and top chords or top plates 132 of endwall assemblies 120 and 122. Insulating foam is preferably disposed within respective joints or flexible connections formed between roof assembly 40 and adjacent portions of sidewall assemblies 150 and 152. Trim molding (not expressly shown) may be bonded with adjacent portions of roof assembly 40 and sidewall assemblies 150 and 152.

Each sidewall assembly 150 and 152 preferably includes respective openings 154 with door assembly 180 attached thereto and slidably mounted thereon. See FIGS. 1 and 2. Each door assembly 180 has a first position blocking respective opening 154 to form a barrier between interior 32 and the exterior of box structure 30. Each door assembly 180 has a second position which allows access to interior 32 of box structure 30 through respective opening 154. Various types of doors may be satisfactory used with box structure 30, including doors fabricated from steel and/or wood, or doors fabricated from composite materials.

Door assemblies 180 may be formed from materials with thermal insulation characteristics corresponding with the associated sidewall assembly 150 and 152. Each door assembly 180 is preferably mounted on respective sidewall assemblies 150 and 152 adjacent to respective portion 150b and 152b using conventional hardware such as operating pipes, operating mechanisms, rollers, locking bars, gears and cams associated with conventional railway boxcars. Such items may be obtained from several vendors including YSD Industries, Inc. (Youngstown Steel Door), and Pennsylvania Railcar.

Each door assembly 180 will generally be slidably mounted on upper track 196 and lower track 198. Door frame assembly 190 may include-upper track 196 and portions of top chord 178. Upper track 198 is shown attached with adjacent portions of top chord 178. Various welding techniques and/or mechanical fasteners may be used as desired.

Door frame assembly 190 is preferably attached to the perimeter of each opening 154 formed in respective sidewall assemblies 150 and 152. Each door frame assembly 190 may include a pair of vertical door posts 191 and door header or door retainer (not expressly shown). Upper door track 196, lower door track 198, and a threshold (not expressly shown) may also be installed adjacent to each door frame assembly 190. Vertical door posts may be attached with an secured to adjacent portions of sidewall assemblies 150 and 152. Each door header may be disposed between and attached to associated vertical door post at the top of each opening 154. Door stops (not expressly shown) may be mounted on the exterior of each sidewall assembly 150 and 152 to limit movement of associated door assembly 180 from its first position to its second position.

A pair of elastomeric gaskets may be formed on the interior of each door frame assembly 190 adjacent to the perimeter of the respective door assembly 180. See FIG. 8. The elastomeric gaskets preferably form respective contacts with adjacent portions of door assembly 180 when each door assembly 180 is in its first position. The elastomeric gaskets and portions of door frame assembly 190 cooperate with each other to minimize heat transfer between the interior and the exterior of box structure 30, when each door assembly 180 is in its first, closed position. The door seal assembly shown in FIG. 8 may include a conventional door gasket or seal 192. An additional door gasket or seal 194 having the general configuration of a "sharks tooth" may also be provided. For some applications conventional door gasket or seal 192 may be permanently attached with adjacent portions of door assembly 190.

A layer of insulating coating 300 may be placed on interior portions of floor assembly 80, sidewall assemblies 150 and 152, endwall assemblies 120 and 122. Insulating coating 300 will generally not be applied to floor assembly 80a. See FIG. 3. For some applications, insulating coating 300 may have a thickness of approximately one-fourth of an inch or greater on interior surface 82 of floor assembly 80. See FIG. 4. For some applications, insulating coating 300 may have a ceramic microsphere density of approximately 40% to 60%. The thickness of the coating 300 on interior surfaces 162 of sidewall assemblies 150 and 152 and interior surfaces 124 of each endwall assembly 120 and 122 may be approximately 0.020 inches. Fiber reinforced plastic strands may also be placed within insulating coating 300. Coating 300 may be obtained from several companies such as International Coatings.

Various types of mechanical tie down assemblies and cargo anchors may be provided within interior 32 of box structure 30. All tie down assemblies and/or cargo anchors are preferably located adjacent to and/or attached with portions of sidewall assemblies 150 and 152. Floor assembly 80 may have a generally smooth, uniform surface 82 without any tie down assemblies and/or cargo anchors disposed therein.

The load restraint system shown in FIGS. 3-6 may include two systems, floor anchor system 50 and sidewall anchor system 52. For some embodiments floor anchor system 50 may include subsystems 50a and 50b. Floor subsystems 50a and 50b may have similar features and performance characteristics. Floor anchor subsystem 50a may be installed adjacent to respective side sill assembly 250 and floor anchor subsystem 50b may be installed adjacent to side sill assembly 252. Floor anchor system 50 may be designed to accommodate loads of 24,000 pounds or greater similar to conventional floor anchors for boxcars. Problems with clean out of conventional floor anchors and increased heat transfer associated with conventional floor anchors have previously been noted.

Floor anchor subsystem 50a may include anchor restraint 56a with a plurality of openings 58 formed therein. Anchor restraint 56a may be generally described as an angle attached to and extending longitudinally along surface 251 of side sill 250. For some applications anchor restraint 56a may be described as a longitudinal supporting member formed from a generally L-shaped angle. Floor anchor subsystem 50b may include anchor restraint 56b similar to anchor restraint 56a.

Anchor restraints 56a and 56b may be attached with respective surfaces 251 of side sill assemblies 250 and 252. Anchor restraints 56a and 56b may extend along substantially the full length of respective side sill assemblies 250 and 252. Anchor restraints 56a and 56b may be formed from metal angles having desired dimensions compatible with railway car underframe 200, sidewall assemblies 150 and 152 and floor assembly 80. For example, metal nailable floor assembly 80a may require the use of angles which provide a greater height to accommodate the increased thickness associated with metal planks 84. A plurality of openings 58 are preferably formed in each anchor restraint 56a and 56b. Openings 58 extend into adjacent portions of sidewall assemblies 150 and 152. U.S. Pat. No. 6,494,651 entitled "Railcar Anchor and Load Snugger Arrangement" shows one example of load restraining anchor assemblies which may be releasably engaged with respective openings or holes 58 at desired locations within box structure 30.

As shown in FIG. 4 a plurality of bolts or Huck type fasteners 246 may be satisfactorily used to securely engage each anchor restraint 56a and 56b with respective side sills 250 and 252. A layer of thermal insulating material 248 may be disposed between surface 251 of respective side sill 250 and associated anchor restraint 56b. Other types of mechanical fasteners may also be satisfactorily used to attach anchor restraints 56a and 56b with respective side sills 250 and 252. The present invention is not limited to use with Huck type fasteners 246.

A plurality of generally U-shaped enclosures 60 are preferably disposed within sidewall assembly 150 between adjacent support posts 156 proximate respective openings 58. Similar U-shaped enclosures (not expressly shown) may be installed in sidewall assembly 152. The location of enclosures 60 is preferably selected to correspond with anchor restraints 56*a* and 56*b* and respective openings 58. During clean out of box structure 30, enclosures 60 prevent water or other fluids from contacting foam insulation disposed between side sheets 170 and side sheets 160.

Figures 12, 13:
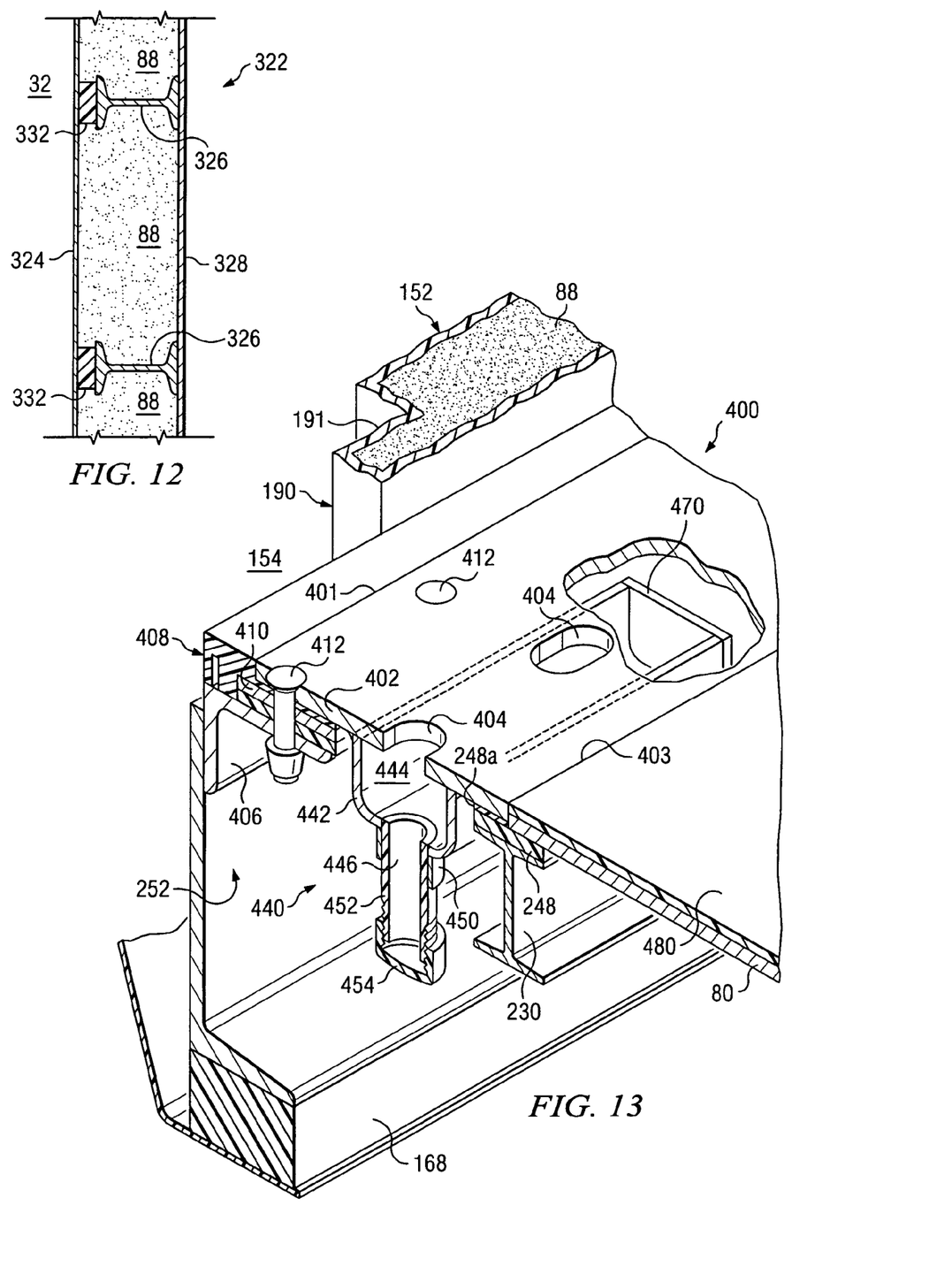
FIG. 12 is a schematic drawing in section with portions broken away showing one example of an endwall assembly satisfactory for use with the insulated boxcar of FIG. 9.
FIG. 13 is a schematic drawing showing an isometric view of one example of a drain system coupled with floor anchors in accordance with teachings of the present invention.

Some boxcars may include relatively wide (approximately 16 feet) openings and corresponding door assemblies. For boxcars with relatively wide openings in the associated sidewall assemblies, one or more conventional cargo anchors may be disposed within the associated floor assembly in the general vicinity of the door opening to allow increased flexibility in positioning and tying down lading. Dotted lines 40 in FIG. 2 represent combined floor anchors and drain systems which may be included as part of boxcars 20 and/or 320. Additional details about floor anchor systems combined with drain systems incorporating teachings of the present invention are shown in FIG. 13.

Figure 6:
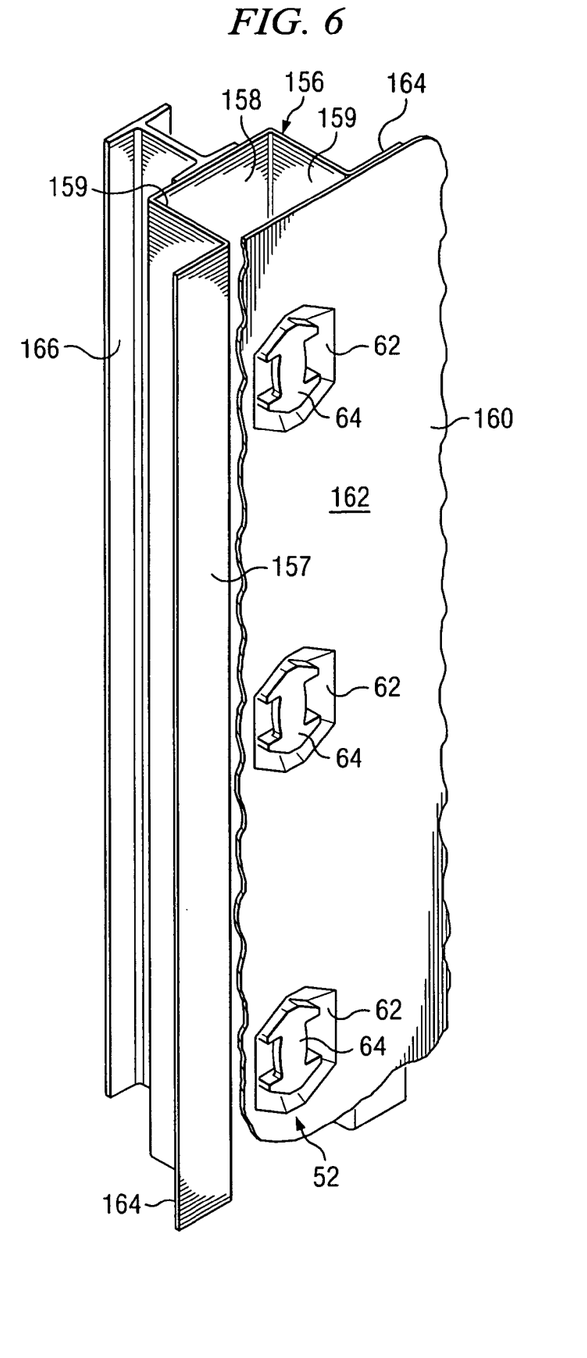
FIG. 6 is a schematic drawing showing an isometric view with portions broken away of a sidewall assembly with various components of a load restraint system incorporating teachings of the present invention.
Figure 7:
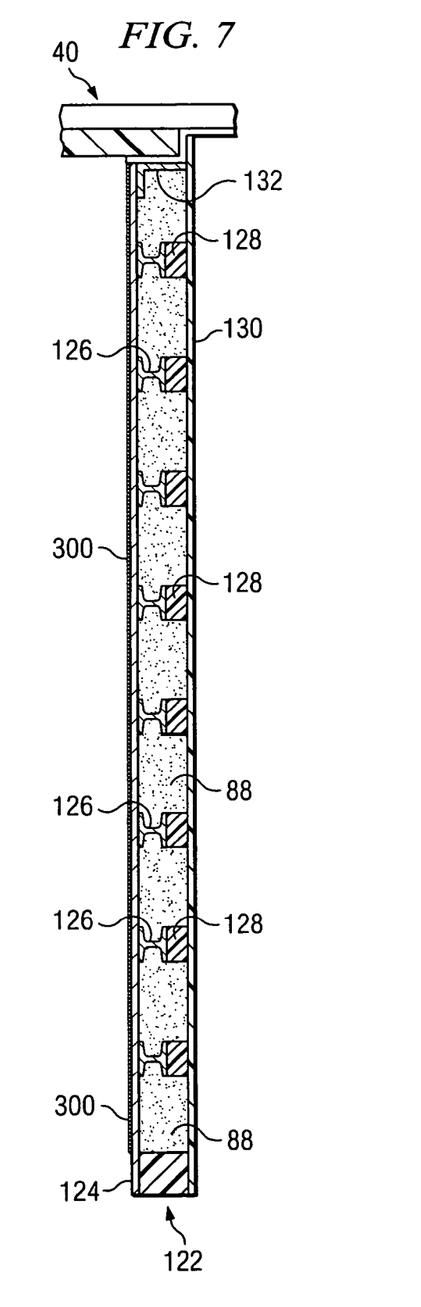
FIG. 7 is a schematic drawing in section with portions broken away showing one example of an endwall assembly satisfactory for use with an insulated boxcar such as shown in FIGS. 1 and 2.
Figure 8:
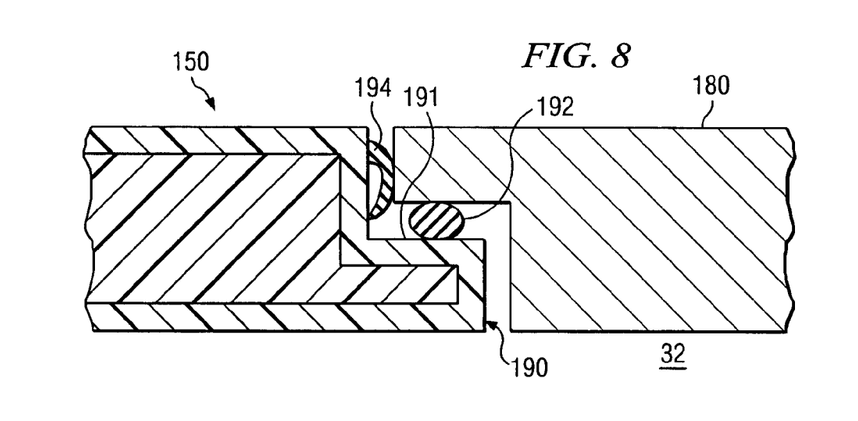
FIG. 8 is a schematic drawing in section with portions broken away showing one example a double seal assembly satisfactory for use with a insulated boxcar incorporating teachings of the present invention.

FIGS. 3 and 6 show examples of various components associated with sidewall anchor system 52 formed in accordance with teachings of the present invention. For some applications the components of sidewall anchor system 52 may support loads of approximately 8,000 pounds. Support posts 156 may be described as having a generally channel shaped or hat shaped cross section. Support post 156 may also be described as a generally C-shaped channel defined in part by web 158 with respective legs 159 extending therefrom. Respective flanges 164 extend from legs 159 opposite from web 158. Side sheets 160 may be attached with respective first surfaces 157 of flanges 164 to form interior surfaces 162 sidewall assembly 150 and 152.

Figure 10:
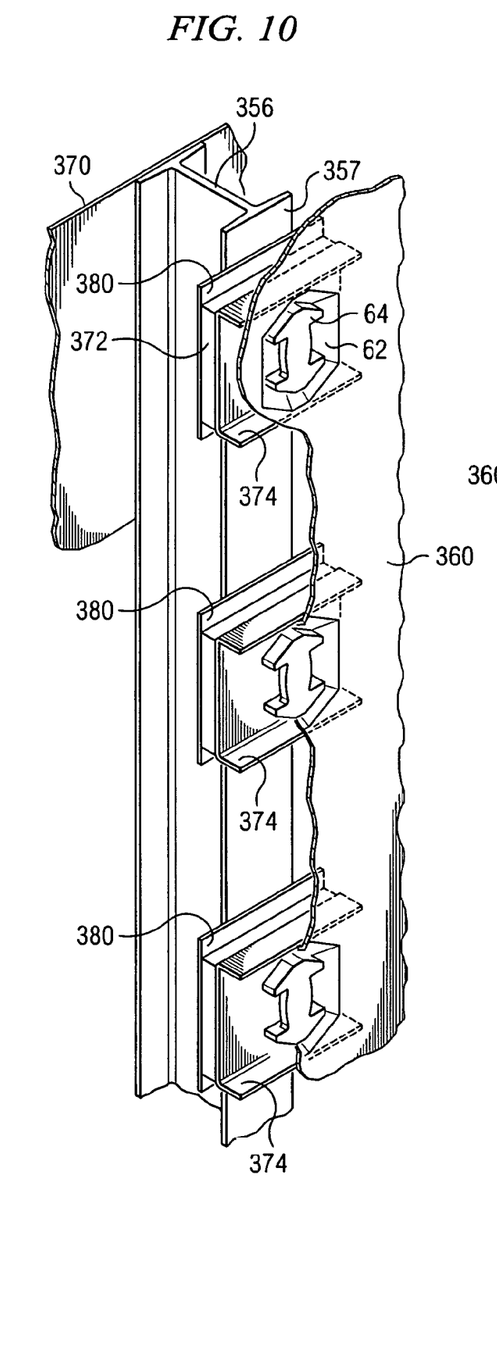
FIG. 10 is a schematic drawing showing an isometric view with portions broken away of a sidewall assembly, support post and associated components of a load restraint system incorporating teachings of the present invention.

A plurality of indentations or pockets 62 may be formed in side sheets 160 approximate the center of selected support posts 156. For some applications a row of generally hexagonally shaped indentations 62 may be formed in side sheets 160 extending vertically along the selected support posts 156. Each column of indentations 62 may extend from approximately twelve inches (12") above floor assembly 80 to a selected location beneath roof assembly 40. Various types of cargo anchors and tie down assemblies may be secured within each indentation 62 using conventional techniques associated with fabrication of railway cars. For embodiments of present invention as shown in FIG. 6 and 10 respective cargo anchors 64 may be disposed within each opening or indentation 62. Cargo anchors may be obtained from several companies including IRECO Inc. located in Chicago, Ill.

Figure 9:
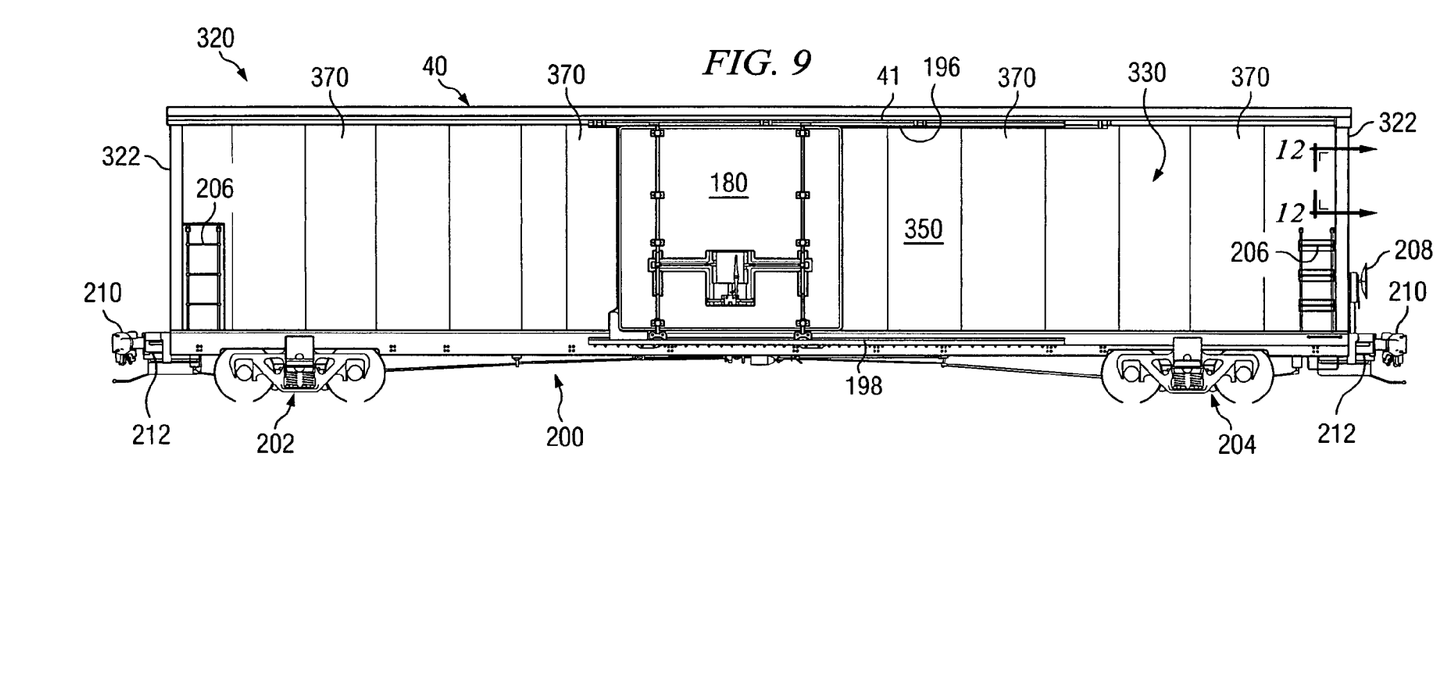
FIG. 9 is a schematic drawing in elevation showing a side view of another insulated boxcar incorporating teachings of the present invention.

Insulated boxcar 320 as shown in FIG. 9 preferably includes box structure 330 mounted on railway car underframe 200. Insulated boxcar 320 may be modified to include a temperature control system (not expressly shown) and an airflow management system (not expressly shown). For embodiments of the present invention as shown in FIGS. 9-12, insulated boxcar 320 may have a similar configuration and dimensions as previously described with respect to insulated boxcar 20. Insulated boxcar 320 may be formed with roof assembly 40 and floor assembly 80 or floor assembly 80*a* as previously described with respect to insulated boxcar 20. Box structure 330 preferably includes various components associated with floor anchor system 50 and sidewall anchor system 52.

Each sidewall assembly 350 preferably includes a respective opening with door assembly 180 slidably mounted thereon. Door stops (not expressly shown) may be placed on upper track 196 and lower track 198.

Box structure 330 may be formed with a pair of sidewall assemblies 350 and a pair of endwall assemblies 322. For some applications, sidewall assemblies 350 may have a generally uniform wall thickness of approximately five and nine sixteenths inches (5 9/16") to provide desired thermal insulation characteristics. Each sidewall assembly 350 may have substantially the same configurations and dimensions defined in part by a relatively uniform thickness extending between endwall assemblies 322.

Many railway boxcars are manufactured with openings and doors having a nominal width of approximately twelve (12) feet. Floor anchor system 50 will generally provide sufficient anchor locations such that traditional cargo loading patterns may be used. For boxcars (not expressly shown) with sidewall openings and doors having a nominal width of approximately sixteen (16) feet, one or more conventional cargo anchors or load restraints may disposed within the associated floor assembly proximate the each opening in the associated sidewall assembly See dotted lines 66 of FIG. 2. Limiting the use of cargo anchors and/or load restraints to the vicinity of the door openings will still provide benefits of the present invention with respect to increased thermal insulation, increased enhanced clean out ability and substantial reduction in potential damage to lading transported within the respective boxcar and at the same time, provide traditional load carrying patterns.

Figure 11:
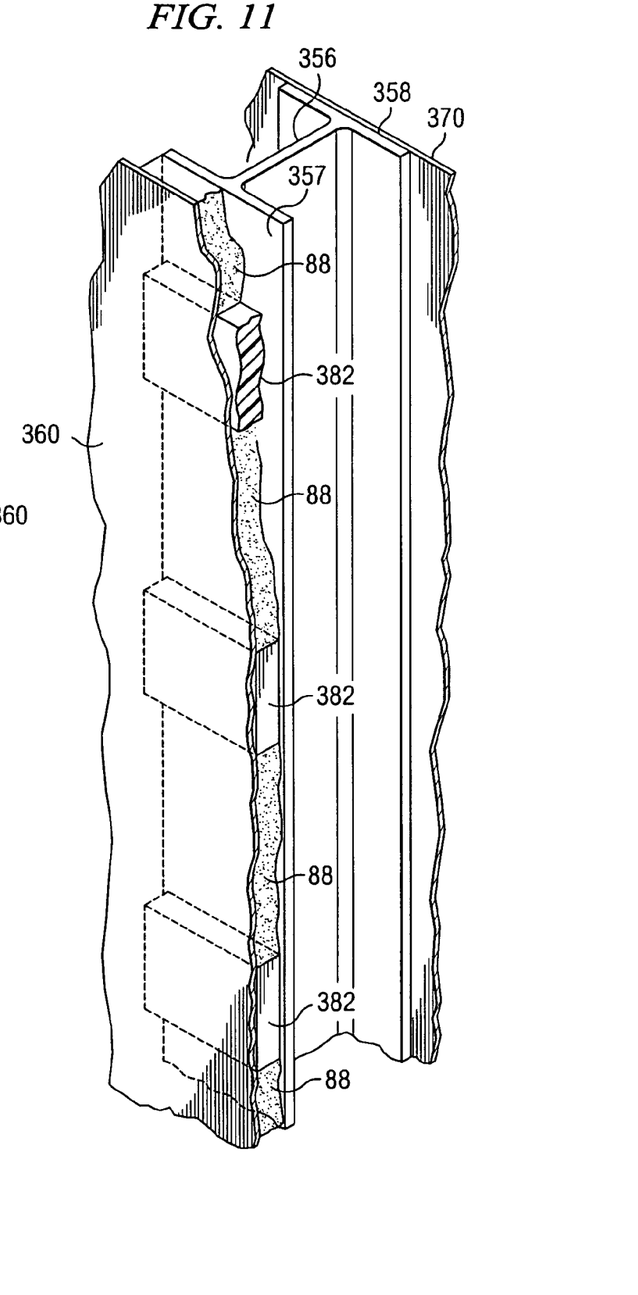
FIG. 11 is a schematic drawing showing another isometric view with portions broken away of the sidewall assembly of FIG. 10.

Interior and exterior surfaces of each sidewall assembly 350 may be formed by a plurality of side sheets 360 and 370. For some applications side sheets 370 may be metal sheets with a nominal thickness of approximately 3/16ths of an inch. Side sheets 360 may be metal sheets with a nominal thickness of approximately 1/8th of inch. For other applications, interior surfaces of box structure 330 may be panels or sheets formed from wood and/or various types of composite materials. A plurality of support posts 356 may be disposed between and bonded with respective side sheets 370 and 360. For some embodiments as shown in FIGS. 10 and 11, support posts 356 may have the general configuration of an I-beam. Each support post 356 preferably includes first surface 357 and second surface 358. Respective side sheets 370 may be attached with second surface 358 of each support post 356.

For some applications a plurality of back-up plates 380 may be attached with first surface 357 of selected support posts 356 associated with sidewall anchor system 52. See FIG. 10. Back-up plates 380 may be formed from metal alloys or composite materials. Isolator 372 may be attached with each support plate 360. A generally C-shaped channel 374 may then be attached with each isolator 372 extending therefrom. A plurality of openings or indentations 62 are perfectly formed in each side sheet 360 at a location corresponding approximately with the respective C-shaped channels 374. For some applications, seven (7) cargo anchors 64 may be installed in respective indentations 62 adjacent to selected support posts 356 associated with sidewall anchor system 52.

Isolators 382 (not shown in FIG. 10) may also be attached to support posts 356 between adjacent indentations 62 to provide additional support for side sheets 160. Isolators 382 may be particularly beneficial as the distance between adjacent indentation 62 increases. For example, isolators 382 may be used when the distance between indentations is approximately two feet. The number of cargo anchors 64 may be varied as desired for each boxcar design.

The interior surfaces of a boxcar are often divided into quadrants defined in part by openings for the respective door assemblies. Within each quadrant, four sidewall anchor systems 52*b* may be disposed on selected support posts 356. For example, four support posts 356 may be selected within each quadrant to form sidewall anchor system 52.

FIG. 11 shows one of the support posts 356 which is not associated with sidewall anchor system 52. A plurality of PVC blocks or isolators 382 are preferably disposed between the first surface of support post 356 and metal sheets 360. Insulating foam 88 may also be disposed between respective isolators 382. Insulating foam 88 may also be disposed between isolators 382 and interior surfaces of side sheets 370 and 360. Isolators 372 and 382 may be formed from PVC type materials or other composite materials with desired heat transfer characteristics.

End wall assemblies 322 may be formed using similar materials and techniques as previously described with respect to sidewall assemblies 350. End wall assemblies may be formed with end beams 326 having an I-beam type configuration. End beams 326 may be disposed within endwall assemblies 322 extending generally horizontally with respect to each other and railway car underframe 200. See FIG. 12. End beams 326 may be attached with exterior end sheet 328. Respective isolators 332 formed from various types of insulating materials may be disposed between each end beam 326 and interior end sheet 324. Foam insulation 88 may be disposed between and bonded with adjacent portions of end beams 326 and end sheets 324 and 328. One endwall assembly 322 may be mounted on the first end or A end of railway car underframe 200. In a similar manner, another endwall assembly 322 may be mounted on the second end or B end of railway car underframe 200.

FIG. 13 shows one example of a floor anchor system combined with a drain system in accordance with teachings of the present invention. Floor anchor system 400 preferably includes metal plate 402 disposed adjacent to door opening 154 formed in sidewall assembly 152. For purposes of describing various features of the present invention, portions of sidewall assembly 152 and floor assembly 80 are shown in FIG. 13 with associate door 180 in its second, open position. A similar floor anchor system (not expressly shown) may also be disposed adjacent to door opening 154 formed in sidewall assembly 150.

For some applications, cargo anchor plate 402 may have dimensions of approximately sixteen feet (16') in length, nine and one-half inches(9½") inches in width and approximately one-half inch (½") in thickness. A plurality of openings 404 may be formed in cargo anchor plate 402 for use in securing lading. Longitudinal edge 403 of cargo anchor plate 402 may be disposed on and attached to longitudinal stringer 230 adjacent to door opening 154. Longitudinal edge 401 may be securely engaged with angle 406 which is attached to sidesill assembly 252 immediately adjacent to respective door opening 154. Threshold 408 formed from PVC or other types of composite materials may be securely attached with angle 406. For some applications, metal reinforcing plate 410 may be disposed within threshold 408. A plurality of huck type fasteners 412 may be used to securely engage longitudinal edge 401 of cargo anchor plate 402 with threshold 408 and angle 406.

Drain system 440 may include generally U shaped channel 442 attached to and extending downwardly from cargo anchor plate 402. Channel 442 cooperates with cargo anchor plate 402 to form cargo anchor cavity 444 which communicates with openings 404. The length of channel 442 may be selected to correspond approximately with the length of cargo anchor plate 402. Respective end closures 470 may be attached to opposite ends of channel 442.

At least one opening may be formed in channel 442 to allow removal of water and other liquids from cargo anchor cavity 444. For some applications such as shown in FIG. 13, respective openings 446 may be formed proximate opposite ends of channel 442. Respective metal pipes 450 may be engaged with channel 442 proximate each opening 446. For some applications, pipes 452 formed from PVC or other types of composite materials may be disposed within and securely attached to the interior of respective pipes 450. Various techniques such as adhesive bonding may be satisfactorily used to securely engage each pipe 452 within respective pipe 450. For some applications, cap 454 may be engages with the end of each pipe 452 opposite from cargo anchor cavity 444. For some applications, threaded connections may be used to engage cap 454 with respective pipe 452. However, a wide variety of plugs, caps and other typed of closures may be satisfactorily used with a floor anchor system and drain system incorporating teachings of the present invention. The present invention is not limited to pipes 450 and 452 and cap 454 as shown in FIG. 13.

For the embodiment shown in FIG. 13 floor assembly 80 may include sheets 480 of PVC type material disposed on surface 82 of floor assembly 80. PVC sheets 480 may be used as an alternative to previously described coating 300. Relatively thin strip 248a formed from PVC type material may be used to accommodate any differences between the thickness of cargo anchor plate 402 and the combined thickness of floor assembly 80 with sheets 480. Strip 248a may be used to provide a smooth entrance adjacent to associated opening 154.

One example of a boxcar formed in accordance with teachings of the present invention may have the following features:

286,000 lb. Gross Rail Load;
Standard car equipped with two 8'0" wide by 12'4" high insulated plug doors;
optional 15" end-of-car cushioning unit;
Meets AAR Plate "F" Clearance Diagram;
Optional wireless monitoring system;
Ceramic/epoxy coating on interior surfaces;
Conventional urethane foam insulation;
Durable, wood free interior materials; and
Lightweight nonmetallic exterior surfaces.

| | |
|---|---|
| Length Inside | 60'9" |
| Length Over Coupler Pulling Faces | 69'3¾" |
| Length over Strikers | 64'8¾" |
| Length Between Truck Centers | 46'3" |
| Truck Wheel Base | 5'10" |
| Width, Extreme | 10'6⅝" |
| Width, Inside | 9'6" |
| Height, Extreme | 16"11⅞" |
| Height Inside at Center Line of Car | 12'10¾" |
| Estimated Lightweight | 89,000 lbs. |
| Estimated Load Limit | |
| Based on 286,000 lbs. Gross Rail Load | 97,000 lbs. |
| Gross Rail Load | 286,000 lbs. |
| Cubic Capacity (Between bulkheads) | 7,442 cubic feet |
| Cubic Capacity | 7,442 cubic feet |
| (Level with height of sides) | |

Although the present invention and its advantages have been described in detail, it should be understood that various changes, substitutions and alternations can be made herein without departing from the spirit and scope of the invention as defined by the following claims.

The invention claimed is:
1. A boxcar comprising:
a box structure defined in part by a pair of sidewall assemblies, a pair of endwall assemblies, a floor assembly and a roof assembly;
the floor assembly mounted on a railway car underframe;

the sidewall assemblies mounted on the railway car underframe adjacent to opposite sides of the floor assembly;

a respective longitudinal joint formed between each sidewall assembly and adjacent portions of the floor assembly;

each sidewall assembly having an exterior surface and an interior surface;

a plurality of metal support posts disposed between the interior surface and the exterior surface of each sidewall assembly;

portions of a cargo restraining system disposed within each sidewall assembly proximate the respective longitudinal joint with the floor assembly;

the sidewall assemblies extending respectively along opposite sides of the railway car underframe;

the plurality of metal support posts for each sidewall assembly attached with a respective side sill assembly of the railway car underframe; and layers of insulating material disposed between adjacent portions of the support posts and the respective side sill assemblies.

2. The boxcar of claim 1 wherein the cargo restraining system further comprises:

respective anchor restraints extending longitudinally along opposite sides of the floor assembly;

each anchor restraint disposed adjacent to one of the sidewall assemblies proximate the respective longitudinal joint between the sidewall assembly and the floor assembly;

a plurality of openings formed in each anchor restraint;

the openings sized to receive cargo anchor assemblies; and enclosures disposed within each sidewall assembly adjacent to the openings in the respective anchor restraint.

3. The boxcar of claim 1 comprising:

an exterior surface of each sidewall assembly formed in part by layers of fiber reinforced plastic material;

an interior surface of each sidewall assembly formed in part by metal sheets; and insulating materials disposed between and bonded with the layers of fiber reinforced plastic material and the metal sheets.

4. The boxcar of claim 1 comprising:

an exterior surface of each sidewall assembly formed in part by metal sheets;

an interior surface of each sidewall assembly formed in part by layers of fiber reinforced plastic material; and insulating materials disposed between and bonded with the layers of fiber reinforced plastic material and the metal sheets.

5. The boxcar of claim 1 further comprising:

an exterior surface of each sidewall assembly formed in part by a plurality of metal sheets;

an interior surface of each sidewall assembly formed in part by a plurality of metal sheets; and insulating materials disposed between and bonded with the metal sheets forming the exterior surface and the metal sheets forming the interior surface.

6. The boxcar of claim 1 further comprising:

insulating material disposed between the interior surface and the exterior surface of each sidewall assembly; and the boxcar selected from the group consisting of a temperature controlled railway car and an insulated boxcar.

7. The boxcar of claim 1 further comprising the box structure satisfactory for carrying lading selected from the group consisting of coiled steel, lumber, pasteurized and unpasteurized beer, wine, newsprint, paper rolls, automobile parts, household goods, perishable food products and non perishable.

8. A boxcar comprising:

a box structure defined in part by a pair of sidewall assemblies, a pair of endwall assemblies, a floor assembly and a roof assembly;

the floor assembly mounted on a railway car underframe;

the sidewall assemblies mounted on the railway car underframe adjacent to opposite sides of the floor assembly;

a respective longitudinal joint formed between each sidewall assembly and adjacent portions of the floor assembly;

each sidewall assembly having an exterior surface and an interior surface;

a plurality of support posts disposed between the interior surface and the exterior surface of each sidewall assembly;

portions of a cargo restraining system disposed within each sidewall assembly proximate the respective longitudinal joint with the floor assembly;

respective angles extending longitudinally along opposite sides of the floor assembly;

each angle disposed adjacent to and securely engaged with one of the sidewall assemblies proximate the respective longitudinal joint between the sidewall assembly and the floor assembly;

a plurality of openings formed in each angle;

the openings sized to receive cargo anchor assemblies;

generally U shaped channels disposed within each sidewall assembly adjacent to the openings in the respective angle; and the generally U-shaped channels cooperating with each other to prevent fluids used to clean the floor assembly from contaminating insulating materials disposed within the respective wall assembly.

9. A boxcar comprising:

a box structure defined in part by a pair of sidewall assemblies, a pair of endwall assemblies, a floor assembly and a roof assembly;

the floor assembly mounted on a railway car underframe;

the sidewall assemblies mounted on the railway car underframe adjacent to opposite sides of the floor assembly;

a respective longitudinal joint formed between each sidewall assembly and adjacent portions of the floor assembly;

each sidewall assembly having an exterior surface and an interior surface;

a plurality of support posts disposed between the interior surface and the exterior surface of each sidewall assembly;

portions of a cargo restraining system disposed within each sidewall assembly proximate the respective longitudinal joint with the floor assembly;

each support post having an I beam cross section;

a respective backup plate attached to the first surface of each support post;

thermal insulating material attached to the backup plates opposite from the associated support port;

a generally U shaped channel disposed between the thermal insulating material and the interior surface of the associated sidewall assembly; and each pocket disposed in one of the U-shaped channels.

10. A boxcar comprising:

a box structure defined in part by a pair of sidewall assemblies, a pair of endwall assemblies, a floor assembly and a roof assembly;

the floor assembly mounted on a railway car underframe;

the sidewall assemblies mounted on the railway car underframe adjacent to opposite sides of the floor assembly;

a respective longitudinal joint formed between each sidewall assembly and adjacent portions of the floor assembly;

each sidewall assembly having an exterior surface and an interior surface;

a plurality of support posts disposed between the interior surface and the exterior surface of each sidewall assembly;

a plurality of pockets formed within the interior surface of each sidewall assembly;

each pocket disposed adjacent to one of the support posts;

a cargo anchor disposed within each pocket and securely engaged with the respective sidewall assembly;

portions of a cargo restraining system disposed within each sidewall assembly proximate the respective longitudinal joint with the floor assembly;

each support post having an I beam cross section;

a respective backup plate attached to a first surface of each support post;

thermal insulating material attached to the backup plates opposite from the associated support port;

a generally U shaped channel disposed between the thermal insulating material and the interior surface of the associated sidewall assembly; and each pocket disposed in one of the U-shaped channels.

11. The boxcar of claim 10 further comprising the box structure satisfactory for carrying lading selected from the group consisting of coiled steel, lumber, pasteurized and unpasteurized beer, wine, newsprint, paper rolls, automobile parts, household goods, perishable food products and non perishable.

12. An insulated boxcar comprising:

a box structure defined in part by pair of sidewall assemblies, a pair of endwall assemblies, a floor assembly and a roof assembly;

the floor assembly mounted on a railway car underframe;

the sidewall assemblies mounted on the railway car underframe adjacent to opposite sides of the floor assembly;

each sidewall assembly having an interior surface and an exterior surface with insulating materials disposed therebetween;

a plurality of support posts disposed between the interior surface and the exterior surface of each sidewall assembly;

a plurality of pockets formed within the interior surface of each sidewall assembly;

each pocket disposed adjacent to one of the support posts;

a cargo anchor disposed within each pocket and securely engaged with the respective sidewall assembly;

respective anchor restraints extending longitudinally along opposite sides of the floor assembly;

each anchor restraint disposed adjacent to one of the sidewall assemblies proximate a respective longitudinal joint formed between the sidewall assembly and the floor assembly;

a respective backup plate attached with a first surface of at least one support post and thermal isolating material attached with the backup plate opposite from the support post; and a generally C-shaped channels respectively disposed adjacent to the thermal isolating material opposite from the backup plate.

13. The insulated boxcar of claim 12 further comprising each pocket extending into one of the generally C-shaped channels.

14. The boxcar of claim 12 further comprising:

the exterior surface of each sidewall assembly formed at least in part from material selected from the group consisting of steel alloys, aluminum alloys, other metal alloys satisfactory for manufacturing railway cars, wood, fiber reinforced plastic materials and other composite materials; and the interior surface of each sidewall assembly formed at least in part from material selected from the group consisting of steel alloys, aluminum alloys, other metal alloys satisfactory for manufacturing railway cars, wood, fiber reinforced plastic materials and other composite materials.

15. The boxcar of claim 12 further comprising steel interior surfaces disposed within the box structure satisfactory for carrying lading selected from the group consisting of coiled steel, lumber, pasteurized and unpasteurized beer, wine, newsprint, paper rolls, paper products, automobile parts, household goods, appliances, electronic equipment, liquid filled containers, non perishable food products and other packaged goods.

16. The boxcar of claim 12 further comprising the support posts selected from the group consisting of steel alloys, aluminum alloys and composite materials.

* * * * *